United States Patent [19]
Bendfeld

[11] Patent Number: 5,945,764
[45] Date of Patent: Aug. 31, 1999

[54] WINDING ELEMENT FOR AN ELECTRICAL MACHINE, ASSEMBLY AND SET HAVING A PLURALITY OF WINDING ELEMENTS

[75] Inventor: Udo Bendfeld, Oberhausen, Germany

[73] Assignee: Siemens Aktiengesellschaft, Munich, Germany

[21] Appl. No.: 09/009,563

[22] Filed: Jan. 20, 1998

Related U.S. Application Data

[63] Continuation of application No. PCT/DE96/01239, Jul. 9, 1996.

[30] Foreign Application Priority Data

Jul. 18, 1995 [DE] Germany .......................... 195 26 198

[51] Int. Cl.⁶ ..................................................... H02K 3/32
[52] U.S. Cl. ........................... 310/196; 310/213; 174/109
[58] Field of Search ....................................... 310/196, 213; 174/102 R, 102 SP, 108, 109, 126.4

[56] References Cited

U.S. PATENT DOCUMENTS

| | | | |
|---|---|---|---|
| 3,051,771 | 8/1962 | Lee | 174/102 R |
| 3,240,867 | 3/1966 | Maddox | 174/102 SP |
| 3,474,186 | 10/1969 | Hale | 174/102 R |
| 4,038,741 | 8/1977 | Schuler | 310/208 |
| 5,030,870 | 7/1991 | Wichman | 310/215 |
| 5,319,276 | 6/1994 | Schuler | 310/196 |

FOREIGN PATENT DOCUMENTS

| | | |
|---|---|---|
| 1 021 062 | 12/1957 | Germany . |
| 1 118 290 | 11/1961 | Germany . |
| 87 03 580 | 6/1987 | Germany . |
| 42 18 928 A1 | 12/1993 | Germany . |
| 62-123936 | 6/1987 | Japan . |
| 521 661 | 5/1972 | Switzerland . |
| 91/01059 | 1/1991 | WIPO . |
| 93/06646 | 4/1993 | WIPO . |

OTHER PUBLICATIONS

Patent Abstracts of Japan No. 57–065239 (Shunichi), dated Apr. 20, 1982.

"Potential steering at the emergency exit of high voltage windings in electrical machines", L 20 723/21d Gm, pp. 1–5.

*Primary Examiner*—Nestor Ramirez
*Assistant Examiner*—Burt Mullins
*Attorney, Agent, or Firm*—Herbert L. Lerner; Laurence A. Greenberg

[57] ABSTRACT

A winding element for an electrical machine, in particular a turbogenerator, includes an electrically conductive conductor configuration for carrying an electric current, an insulating layer surrounding the conductor configuration and a protective configuration surrounding the insulating layer. The protective configuration includes an isolating layer disposed like a helix, and an at least slightly electrically conductive contact layer likewise disposed like a helix and overlapping itself. The contact layer traverses or passes through the isolating layer from an inner side facing the insulating layer to an outer side facing away from the insulating layer. A winding assembly for an electrical machine includes an electrically conductive winding support and a winding element circumferentially surrounded and electrically contacted by the winding support. A set has a plurality of such winding elements in which the conductor configurations are connected to one another and form a winding for an electrical machine, in particular a turbogenerator.

15 Claims, 4 Drawing Sheets

WINDING ELEMENT FOR AN ELECTRICAL MACHINE, ASSEMBLY AND SET HAVING A PLURALITY OF WINDING ELEMENTS

CROSS-REFERENCE TO RELATED APPLICATION

This application is a continuation of International Application Serial No. PCT/DE96/01239, filed Jul. 9, 1996 which designated the United States.

BACKGROUND OF THE INVENTION

FIELD OF THE INVENTION

The invention relates to a winding element for an electrical machine, having an electrically conductive conductor configuration for carrying an electric current, an insulating layer which surrounds the conductor configuration and a protective configuration which surrounds the insulating layer and has an isolating layer. The invention also relates to an assembly and a set having a plurality of such winding elements.

Published International Patent Application WO 91/01059 A1 corresponding to U.S. Pat. No. 5,030,870, as well as Published International Patent Application WO 93/06646 A1, disclose a winding element of a known type and notes relating to a combination of such a winding element with identical winding elements to form a set, wherein the winding elements are connected to one another and form a winding for an electrical machine, specifically a turbogenerator. The protective configuration in such a winding element is used to compensate for mechanical expansion, which results when the winding element is subjected to changing temperatures. The protective configuration forms an electrically screened zone in the isolating layer. The electrically screened zone surrounds the conductor configuration and the insulating layer and has a strength which is considerably less than the strength of the insulating layer and the strength of the conductor configuration. Thus, when expansion occurs, the expansion can be compensated for by gaps which are formed in the isolating layer. As stated, each of those gaps is electrically screened. For that reason, it is not possible for any corona discharge to form in the gap, which could damage the winding element. The electrical screening of the isolating layer is formed by using electrically conductive textiles, in particular woven or non-woven fabrics, which enclose between them the isolating layer that contains flakes of mica splittings as effective components. The electrically conductive textiles may be textiles made of electrically conductive fibers, in particular certain plastic fibers, and they may also be made of electrically insulating fibers, for example glass fibers, and be made electrically conductive subsequently by the addition of further components, for example electrically conductive coatings and/or soot. In order to ensure the electrical screening of the isolating layer, the electrically conductive contact layers or bridges which enclose it and run through the isolating layer make contact with one another electrically. Those bridges are formed by a further textile strip, which is at least slightly electrically conductive. The isolating layer itself is prepared as a strip which contains the flakes of mica splittings. The flakes of mica splittings tend to split further and it is that tendency on which the reduced strength of the isolating layer and the formation of gaps during a mechanical expansion process are based. The strip is wound onto the winding elements and another electrically conductive strip, which forms the bridges, is passed alternately over the mica strip or under the mica strip, forming the necessary bridges. The bridges are those sections of the strip which come to rest between two layers, that are located next to one another, of the strip which contains the flakes of mica splittings, and thus extend from an inner side which faces the insulating layer, to an outer side which faces away from the insulating layer, of the strip that contains the mica splittings. The contact layers may be fitted separately from the isolating layer or together with the isolating layer. In particular, one of the contact layers may be a textile carrier material for the flakes of mica splittings.

An important constituent of the insulating components of a winding element for an electrical machine is a resin preparation, into which further constituents of the insulating components, in particular mica preparations, are incorporated. According to normal practice, the mica preparations are contained in strips which are wound onto the conductor configuration of the winding element and are subsequently impregnated with the resin preparation. The resin preparation is initially liquid and viscous and, after it has been introduced into the insulating components, is cured by initiating a specific chemical process. The use of a resin preparation in the form of a mixture of an epoxy resin and an anhydride of an organic acid is normal. The resin preparation is cured by initiating a specific chemical reaction which leads to chemical bonding of the anhydride to the epoxy resin and, in doing so, becomes a solid body. The impregnation and curing can be carried out separately for each winding element. It is also possible, as well as advantageous, for an electrical machine of a size that is normal for electrical machines having power outputs or power consumptions up to 300 MW, to have all of the winding elements initially connected to form the complete winding without prior impregnation and for the winding to be subsequently impregnated with the resin preparation together with a winding support on which it is installed, and for the resin preparation to be cured. That method is known as the "entire impregnation method".

Materials which are in the form of strips, are electrically conductive to a greater or lesser extent and can be used for corona protective configurations on winding elements, as known from German Published, Prosecuted Patent Applications DE-AS 1 021 062 and DE-AS 11 18 290 and Swiss Patent CH-PS 521 661. However, none of those documents refer to the use of such material in the form of a strip in conjunction with an isolating layer, as explained above.

A disadvantage of the winding elements which are known from Published International Patent Application WO 91/01059 A1 corresponding to U.S. Pat. No. 5,030,870 and which are known from Published International Patent Application Wo 93/06646 A1, can result from the fact that the application of the isolating layer with the necessary electrically conductive bridges is relatively complicated and consequently as a rule has to be carried out by manual work.

SUMMARY OF THE INVENTION

It is accordingly an object of the invention to provide a winding element for an electrical machine, an assembly and a set having a plurality of winding elements, which overcome the hereinafore-mentioned disadvantages of the heretofore-known devices of this general type, which simplify and reduce the cost of the necessary production process and which have a protective configuration that can be fitted with little complexity and by machine.

With the foregoing and other objects in view there is provided, in accordance with the invention, a winding element for an electrical machine, comprising an electrically conductive conductor configuration for carrying an electric current; an insulating layer surrounding the conductor configuration; and a protective configuration surrounding the insulating layer; the protective configuration having an isolating layer disposed like a helix with an inner side facing toward the insulating layer and an outer side facing away from the insulating layer; and the protective configuration having an at least slightly electrically conductive contact layer disposed like a helix and overlapping itself, the contact layer traversing or passing through the isolating layer from the inner side to the outer side.

This winding element is distinguished by the fact that bridges, which are costly to produce, are no longer required. A distinction is drawn from the normal practice of having to provide a continuous three-layer structure for the protective configuration. In contrast, an essentially two-layer structure of the protective configuration is now taught, with the two layers which are still required, namely the isolating layer and the contact layer, being passed around the winding element like a helix. As a result of this helix-like configuration, it is possible to dispense with the bridges, which are costly to produce, since as a result of overlapping itself, the contact layer itself passes in a variety of ways from an inner side of the isolating layer to an outer side of the isolating layer and can thus produce the electrical bonding which is required for electrical screening of the isolating layer. In addition, it is possible to achieve bridging on the outside of the winding element in the circumferential direction through the use of a winding support. The latter surrounds the winding element in the circumferential direction and makes contact with it. In consequence, an outer corona protective current can flow in a predominantly axial direction and not in a helical direction. It is, of course, possible as well as advantageous in the context of certain developments for implementation of the protective configuration in the sense of the invention, to use a three-layer strip made of two electrically conductive layers which enclose a layer of flakes of mica splittings between them. Details of this structure will be explained below.

It is not absolutely essential for the effectiveness of the isolating layer that the isolating layer form a complete covering of the winding element, so that gaps may remain through which the contact layer passes from the inside to the outside of the isolating layer. If required, the isolating layer can overlap itself and can thus form a complete covering on the winding element. Appropriate developments of the invention will be explained below.

In accordance with another feature of the invention, the contact layer covers the isolating layer both on the inside and on the outside, so that neither the inside nor the outside of the isolating layer is exposed. This configuration is particularly advantageous for achieving the electrical bonding which is important to the function of the isolating layer.

In accordance with a further feature of the invention, the contact layer is formed from at least one textile strip, which is at least slightly electrically conductive.

In accordance with an added feature of the invention, the contact layer is formed from an inner contact layer which is fitted on the inside of the isolating layer and from an outer contact layer which is fitted on the outside of the isolating layer, with respective subareas of the inner contact layer and of the outer contact layer making contact with one another electrically between subareas of the isolating layer. The subareas may overlap one another. In the context of such a refinement, the contact layer is formed from two parts and these two parts, namely the inner contact layer and the outer contact layer, are brought into contact with one another between mutually adjacent areas of the isolating layer and thus form the contact layer as a unit. This refinement is advantageous in terms of its production, since it can be produced by winding a three-layer strip, which is formed of the inner contact layer, the outer contact layer and the isolating layer that is fitted between them like a helix and overlaps itself onto the insulating layer of the winding element. In this way, the protective configuration is fitted onto the winding element in a single operation, wherein geometrical details, in particular the question as to whether or not and to what extent two successive layers of the isolating layer overlap one another, are at most of secondary importance. Accordingly, this type of fitting of the protective configuration can be carried out relatively quickly, particularly with the assistance of an appropriate machine. There is no longer any need for careful inspection which, as mentioned, is required during fitting of the known protective configurations.

In accordance with an additional feature of the invention, in the case of the development just described, the inner contact layer and the outer contact layer are each a textile strip which is at least slightly electrically conductive.

In accordance with yet another feature of the invention, the isolating layer is mounted between the inner contact layer and the outer contact layer and thus, as already indicated, a strip is obtained which need only be wound onto the winding element in order to produce the protective configuration.

In accordance with yet a further feature of the invention, the isolating layer is provided with flakes of mica splittings or laminated mica pieces which, as already mentioned, have the desired tendency to form gaps.

In accordance with yet an added feature of the invention, the insulating layer, the isolating layer and the contact layer of the winding element are constructed in such a way that they can be impregnated, in particular in order to make it possible for a curable resin preparation to be applied.

In accordance with yet an additional feature of the invention, the impregnation takes place with a cured resin preparation, and it is still possible to make electrical contact with the contact layer. In this way, a winding support in which the winding element is installed can make electrical contact with the contact layer, and this likewise contributes to desirable electrical bonding between the winding element and the winding support.

With the objects of the invention in view, there is also provided a winding assembly for an electrical machine, comprising an electrically conductive winding support, and a winding element circumferentially surrounded and electrically contacted by the winding support.

With the objects of the invention in view, there is additionally provided a set, comprising a plurality of winding elements, each winding element corresponding to the winding element according to the invention described above, and the conductor configurations connected to one another and forming a winding for an electrical machine, in particular a turbogenerator.

All of the preferred developments of an individual winding element mentioned above are likewise preferred developments of the winding elements of a set composed of a plurality of winding elements.

In accordance with another feature of the invention, all of the insulating layers, all of the isolating layers and all of the contact layers of the winding elements of the set can be impregnated, and they are impregnated, in particular, with a curable resin preparation, and this resin preparation is cured.

In accordance with a concomitant feature of the invention, the winding elements of the set are disposed in an electrically conductive winding support, with each contact layer making electrical contact with the winding support.

This winding support is, in particular, a body formed from a multiplicity of thin, ferromagnetic laminates. The laminates are composed, in particular, of soft iron or of an alloy essentially having the same magnetic characteristics as soft iron. The contact between the winding elements and the winding support leads to the suppression of electrical potential differences between the winding elements or between a winding element and the winding support and thus contributes to a further improvement in the protection of the winding elements against damage resulting from an inadvertently occurring corona discharge or the like. The laminates furthermore produce electrical bridging between adjacent, mutually overlapping paths of a winding element on the outside. This ensures that an outer corona protective current can flow predominantly in the axial direction and not helically around the conductor configuration.

Other features which are considered as characteristic for the invention are set forth in the appended claims.

Although the invention is illustrated and described herein as embodied in a winding element for an electrical machine, an assembly and a set having a plurality of winding elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawings are to some extent laid out to be slightly distorted and/or schematic in order to emphasize certain features in more detail. The drawings should not be regarded as a scale illustration of a specific exemplary embodiment. The information which is imparted with reference to the drawings can be supplemented, if required, by using the knowledge which is available to an appropriately experienced person skilled in the art and the information which results from the cited documents in the prior art.

DESCRIPTION OF THE PREFERRED EMBODIMENTS

Figure 1:
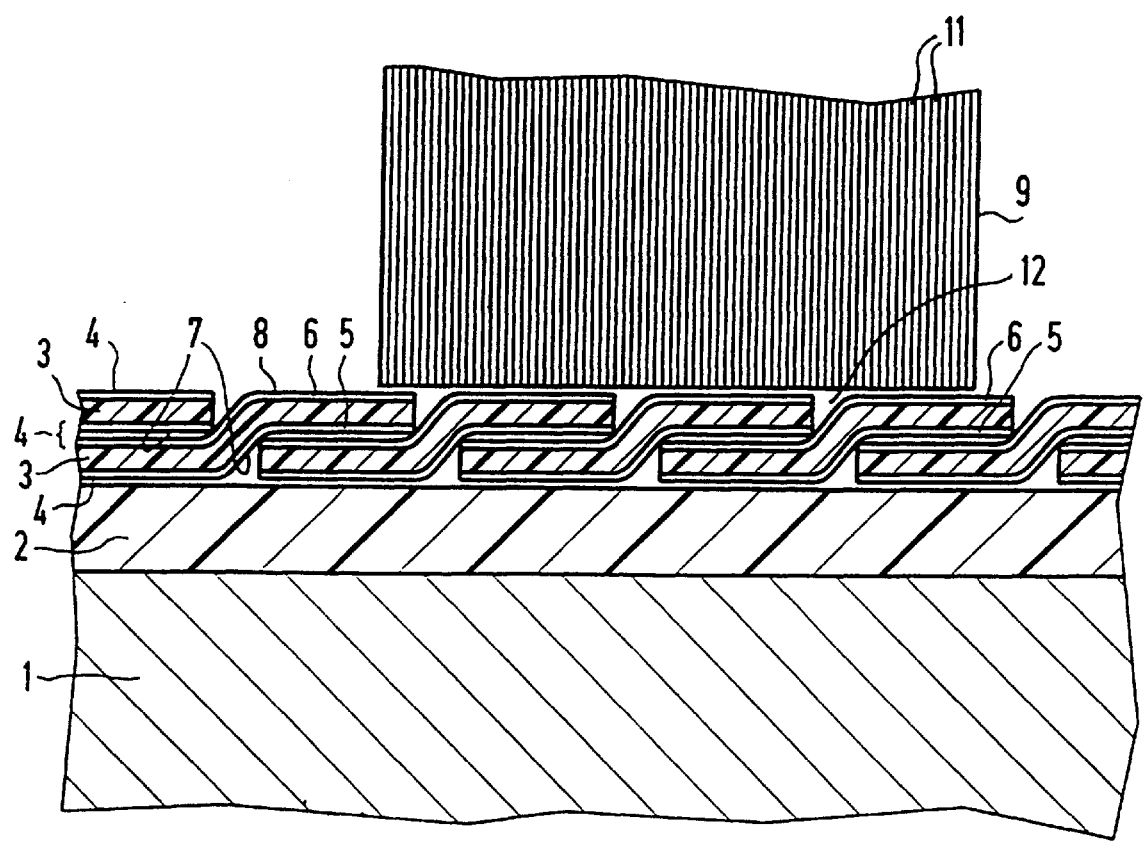
FIG. 1 is a fragmentary, diagrammatic, cross-sectional view of a winding element which is disposed in a winding support.

Referring now in detail to the figures of the drawings, in which elements that correspond to one another have the same reference numerals, so that the explanations relating to individual figures apply in this sense to all of the figures, and first, particularly, to FIG. 1 thereof, there is seen a winding element which has an electrically conductive conductor configuration 1 that is surrounded by various layers. For simplicity, the conductor configuration 1 is illustrated as a homogeneous, metallic body. However, such a conductor configuration 1 is relatively unusual in practice. In particular, when the conductor configuration 1 is a constituent of a stator winding of an electrical machine such as a turbogenerator, for example, it is a more or less complex structure composed of a multiplicity of electrical conductors in the form of bars or strips, all or some of which may be hollow in order to pass a liquid or gaseous cooling agent through them. Conductor configurations 1 in the form of so-called transposed bars are of particular importance in large electrical machines, in particular turbogenerators, which are constructed to output or consume an electrical power of 10 MW or more. A transposed bar is a configuration having a multiplicity of individual electrical conductors which are in the form of bars and are interleaved with one another in accordance with specific viewpoints. No illustration is provided in the present case, for reasons of simplicity.

The conductor configuration 1 is surrounded by an electrically insulating layer 2. This insulating layer 2 is normally formed by an insulating strip being wound around the conductor configuration 1. The insulating strip can be impregnated and contains a mica preparation as the important functional component. The strip, which is wound onto the conductor configuration 1, is subsequently impregnated with a curable resin preparation, in particular a mixture of an epoxy resin and an acid anhydride, and the resin preparation is cured. As already mentioned, this impregnation and curing may take place before or after the installation of the winding element in a correspondingly provided winding support. Depending on the application, a so-called corona protective configuration can be provided between the conductor configuration 1 and the insulating layer 2, and is used to make the electrical potential in the vicinity of the conductor configuration 1 uniform. This is particularly important if the conductor configuration 1 has a complex internal structure, in particular if it is a transposed bar.

The illustration of a corona protective configuration has likewise been dispensed with, for reasons of simplicity.

The insulating layer 2 of the winding element is surrounded by a protective configuration 3, 4, composed of an isolating layer 3 which is helicoidal or disposed like a helix and overlaps itself, and of a contact layer 4 which is likewise helicoidal or disposed like a helix and overlaps itself. The isolating layer 3 crosses or passes through from an inner side 5 which faces the insulating layer 2, to an outer side 6 which faces away from the insulating layer 2. The isolating layer 3 is distinguished by relatively low mechanical strength, so that the formation of gaps, which occurs when the winding element is subjected to mechanical expansion or shrinkage, is concentrated in the isolating layer 3. The contact layer 4 is at least slightly electrically conductive and sheaths the isolating layer 3 to a certain extent, so that the isolating layer 3 is electrostatically screened. As a consequence of this, it is not possible for any corona discharge to take place in a gap which occurs in the isolating layer 3. The electrical conductivity of the contact layer 4 is preferably matched to the load to be expected on the winding element as a result of alternating magnetic fields. An alternating magnetic field which penetrates or passes through the contact layer 4 specifically leads to an electric current being induced in the contact layer 4. If the conductivity of the contact layer 4 is relatively high, then it must be expected that this electric current will be relatively high. Since the electric current likewise produces a magnetic field, the overall effect is thus an influence on the magnetic field which acts from the outside on the contact layer 4, and this may be undesirable under some circumstances. In addition, under some circumstances, the electric current results in heating of the contact layer 4 which, in a highly unfavorable case, could lead to spark erosion of, or thermal damage to, the winding element. The electrical conductivity of the contact layer 4 must therefore be chosen appropriately in order to avoid disadvantages which may result from those two effects. A comparatively low level of conductivity, as would be expected from a semiconductor on the basis of conventional knowledge, is sufficient under some circumstances to ensure the desired electrical bonding through the contact layer 4. FIG. 1 also shows that the contact layer 4, for its part, is constructed in two parts. In order to emphasize this, the individual elements of the winding element are illustrated as not being in direct contact, but rather at a slight distance from one another. In reality, mutually adjacent elements are, of course, in close contact with one another.

Figure 2:
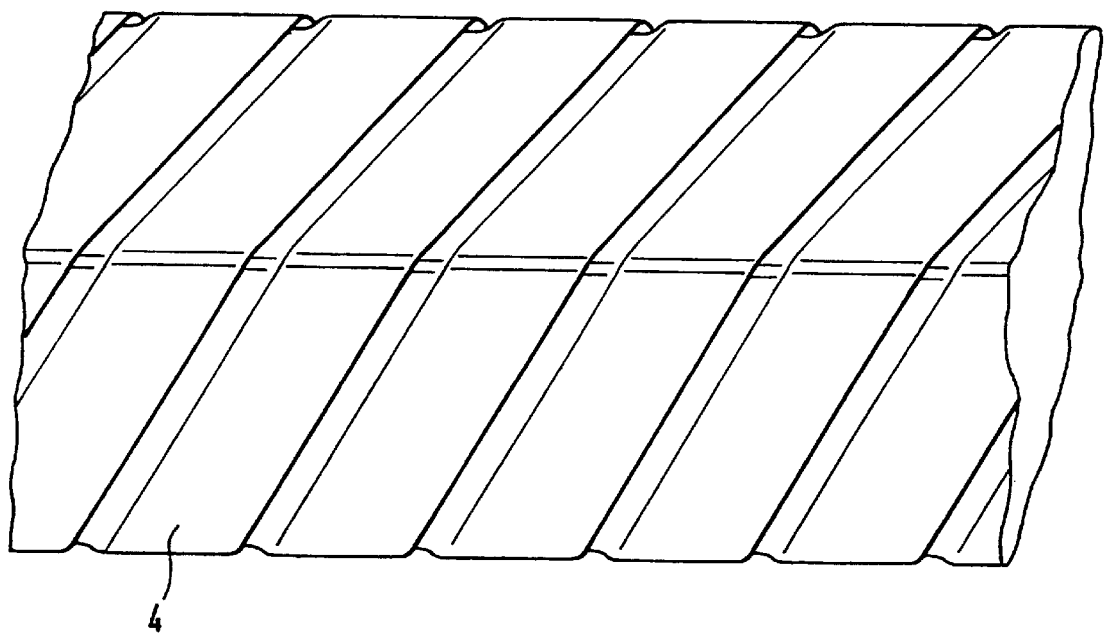
FIG. 2 is a fragmentary, perspective, external view of a winding element.

As is illustrated in FIG. 1, and as can also be seen in FIG. 2, the contact layer 4 is composed of an inner contact layer 7 which is disposed on the inside of the isolating layer 3, and an outer contact layer 8 which is disposed on the outside 6 of the isolating layer 3. The inner contact layer 7 and the outer contact layer 8 rest on one another between mutually overlapping subareas of the isolating layer 3, thus coming into electrical contact with one another, and accordingly form the uniform contact layer 4.

The winding element is disposed in a winding support 9 which is composed of a multiplicity of soft magnetic laminates 11 lying one on top of the other. In particular, the winding element is disposed in a slot which is located in the winding support 9, to be precise together with at least one further, identical winding element. Once again, this is not shown for the sake of simplicity and therefore the documents cited in the prior art should be referred to for exemplary embodiments. The laminates 11 are in electrical contact in the circumferential direction with the outer side 6 of adjacent, mutually overlapping layers of the winding element so that electrical bridging of a gap 12, which is present on the outside 6, between the paths is ensured in the circumferential direction. In consequence, an external corona protective current flows in the axial direction, that is to say parallel to the conductor configuration 1. Without this bridging, the external corona protective current would have to flow helically around the conductor configuration 1, following the spirally-wound winding element.

Figure 3:
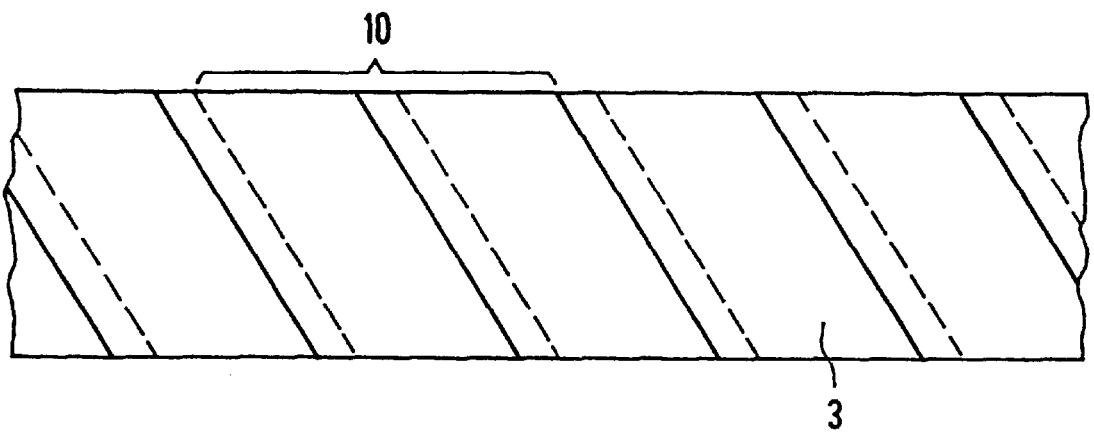
FIGS. 3 and 4 are fragmentary, sectional views of a winding element.
Figure 4:
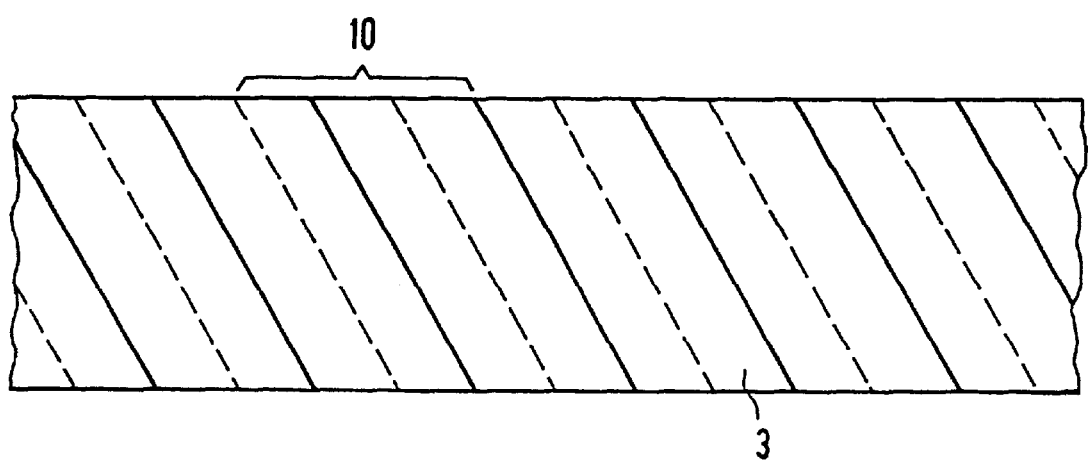

FIGS. 3 and 4 show diagrammatic views of winding elements and are intended in particular to clarify the fact that the tight winding of the winding element with the isolating layer 3, which can be seen in FIGS. 1 and 2, is not essential. According to FIGS. 1 and 2, the configuration of the isolating layer 3 around the insulating layer 2 specifically has essentially two layers, except at those points where the isolating layer 3 of one layer changes directly at the insulating layer 2 to form a further, externally located layer. Such a tight winding results, of course, in particularly good contact between the inner contact layer 7 and the outer contact layer 8, but this is not absolutely essential. FIG. 3 essentially repeats the type of winding which is illustrated in FIGS. 1 and 2. A continuous oblique line represents an edge of the isolating layer 3, which is an edge that can be seen on the outside of the winding element. A line which is drawn by dashes represents that edge of the isolating layer 3 which is hidden under another layer of the isolating layer 3. A bracket 10 shows the solid line and the dashed line between which the strip that forms the isolating layer 3 extends.

FIG. 4 uses the same reference numerals and meanings as FIG. 3 to show a type of winding of the winding element in which two thirds of the isolating layer 3 runs outside the winding element, and only one third runs underneath another layer of the isolating layer 3. According to FIG. 4, the winding element is thus wound more loosely than according to FIGS. 1 to 3, which means that a certain amount of material is saved and, under some circumstances, less care is also required in production.

Figure 5:
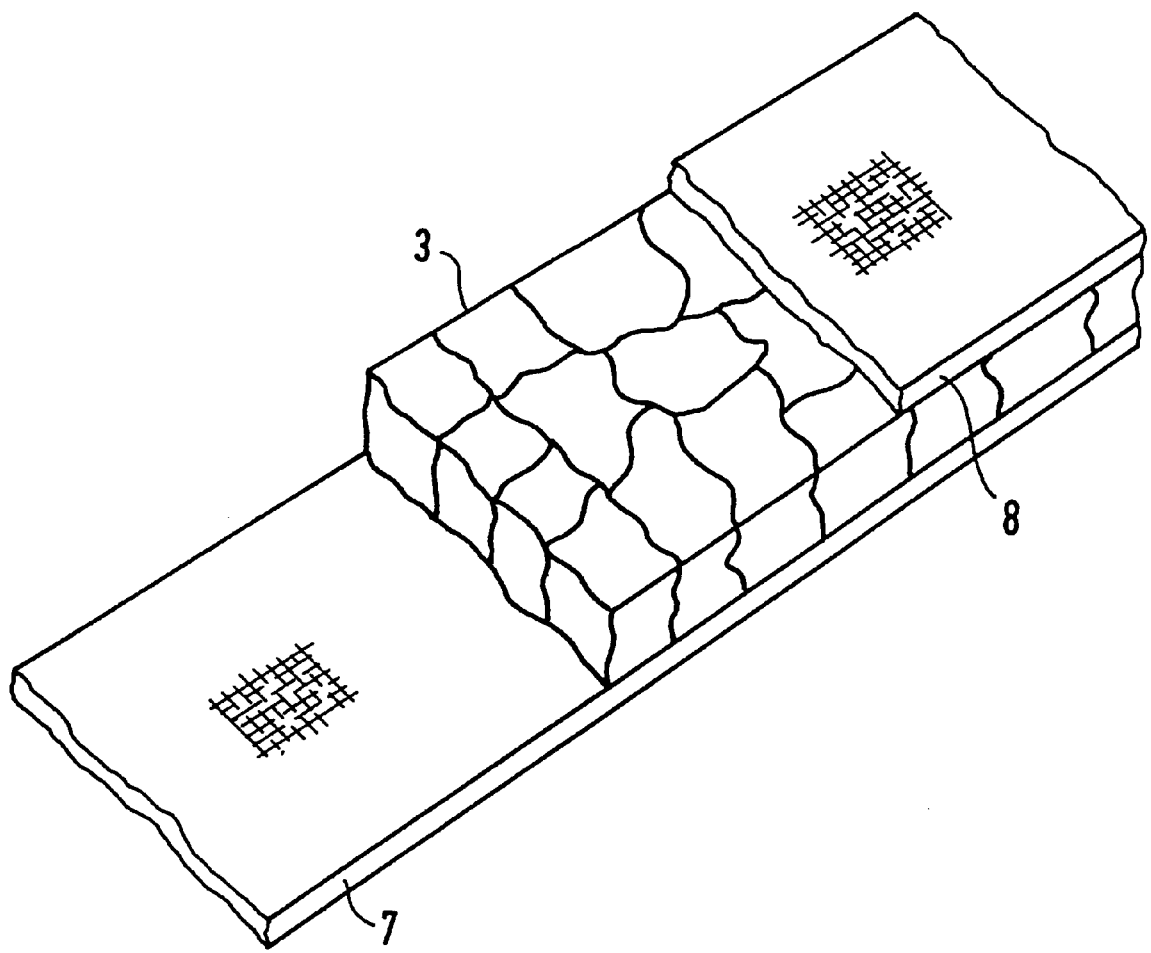
FIG. 5 is a fragmentary, perspective view of a strip which is preferably used for the production of a winding element.

Finally, FIG. 5 shows a strip formed by the inner contact layer 7, the isolating layer 3 and the outer contact layer 8, which would have to be used to produce the winding elements that can be seen in FIGS. 1 to 4. The inner contact layer 7 and the outer contact layer 8 are each composed of an electrically conductive textile strip. The way in which such a textile strip can be produced has already been explained in more detail. The isolating layer 3 is composed essentially of flakes of mica splittings or laminated mica pieces which, as is appropriately known, have relatively low mechanical strength and tend to split relatively easily. These flakes of mica splittings are mounted, in particular bonded, between the inner contact layer 7 and the outer contact layer 8. This strip can be produced by using relevant knowledge or findings and can be stored as an entity, and its processing to produce the above-described winding element is uncomplicated and can be carried out by using relevant known and available methods and machines.

The winding element which has been described is particularly suitable if the impregnation or immersion which is normally carried out by using a curable resin preparation is not intended to be carried out until after the installation of the winding element in a winding support and until after the connection of the winding element to other identical winding elements. In the case of such impregnation and subsequent curing of the resin preparation, a single monolith is formed, so to speak, from the winding elements and the winding support which, however, is subject to a certain amount of mechanical expansion and shrinkage during its production and in the course of its proper operation, which require certain degrees of freedom to be provided to compensate for this expansion and shrinkage. These degrees of freedom must be provided in such a way that their use does not result in any risk of the occurrence of corona discharges and the like. The winding element according to the invention, which can be produced cost-effectively and in an uncomplicated manner, is particularly suitable for this purpose.

The winding element is suitable in particular for electrical machines such as turbogenerators above an electrical rating of 10 MW at a rated voltage of more than 6 kV, or for high-voltage motors with an electrical rating of more than 2 MW and with a rated voltage of about 10 kV or more.

I claim:

1. A winding element for an electrical machine, comprising:

an electrically conductive conductor configuration for carrying an electric current;

an insulating layer surrounding said conductor configuration; and a protective configuration surrounding said insulating layer;

said protective configuration having an isolating layer disposed like a helix with an inner side facing toward said insulating layer and an outer side facing away from said insulating layer, said isolation layer having a mechanical strength sufficient to permit gaps to be formed in said isolation layer when subjected to mechanical forces caused by temperature fluctuations; and said protective configuration having an at least slightly electrically conductive contact layer disposed like a helix and overlapping itself, said contact layer crossing said isolating layer from said inner side to said outer side.

2. The winding element according to claim 1, wherein said contact layer covers said isolating layer both at said inside and at said outside.

3. The winding element according to claim 1, wherein said contact layer is formed from at least one at least slightly electrically conductive textile strip.

4. The winding element according to claim 1, wherein said isolating layer has mutually overlapping subareas, said contact layer is formed from an inner contact layer fitted at said inside and an outer contact layer fitted at said outside of said isolating layer, and said inner and outer contact layers have respective subareas making electrical contact with one another between said mutually overlapping subareas.

5. The winding element according to claim 4, wherein said inner and outer contact layers are at least slightly electrically conductive textile strips.

6. The winding element according to claim 4, wherein said isolating layer is mounted between said inner contact layer and said outer contact layer.

7. The winding element according to claim 1, wherein said isolating layer contains flakes of mica splittings.

8. The winding element according to claim 1, wherein said insulating layer, said isolating layer and said contact layer are impregnable.

9. The winding element according to claim 1, wherein said insulating layer, said isolating layer and said contact layer are impregnated with a cured resin preparation, and said contact layer is electrically contactable.

10. A winding assembly for an electrical machine, comprising:
    an electrically conductive winding support; and
    a winding element circumferentially surrounded and electrically contacted by said winding support, said winding element including:
        an electrically conductive conductor configuration for carrying an electric current;
        an insulating layer surrounding said conductor configuration; and
        a protective configuration surrounding said insulating layer;
        said protective configuration having an isolating layer disposed like a helix with an inner side facing toward said insulating layer and an outer side facing away from said insulating layer, said isolation layer having a mechanical strength sufficient to permit gaps to be formed in said isolation layer when subjected to mechanical forces caused by temperature fluctuations; and
        said protective configuration having an at least slightly electrically conductive contact layer disposed like a helix and overlapping itself, said contact layer crossing said isolating layer from said inner side to said outer side.

11. A set, comprising:
a plurality of winding elements each including:
    an electrically conductive conductor configuration for carrying an electric current;
    an insulating layer surrounding said conductor configuration; and
    a protective configuration surrounding said insulating layer;
    said protective configuration having an isolating layer disposed like a helix with an inner side facing toward said insulating layer and an outer side facing away from said insulating layer, said isolation layer having a mechanical strength sufficient to permit gaps to be formed in said isolation layer when subjected to mechanical forces caused by temperature fluctuations; and
    said protective configuration having an at least slightly electrically conductive contact layer disposed like a helix and overlapping itself, said contact layer crossing said isolating layer from said inner side to said outer side;
said conductor configurations of said winding elements connected to one another and forming a winding for an electrical machine.

12. The set according to claim 11, wherein the electrical machine is a turbogenerator.

13. The set according to claim 11, wherein all of said insulating layers, all of said isolating layers and all of said contact layers are impregnable.

14. The set according to claim 11, wherein all of said insulating layers, all of said isolating layers and all of said contact layers are impregnated with a cured resin preparation.

15. The set according to claim 11, including an electrically conductive winding support making electrical contact with said contact layer of each of said winding elements, said winding elements disposed in said winding support.

* * * * *